United States Patent [19]

Nunziata et al.

[11] Patent Number: 4,583,032
[45] Date of Patent: Apr. 15, 1986

[54] LINEAR MOTION ENCODER

[75] Inventors: Charles A. Nunziata, Wantaugh; James A. White, West Islip, both of N.Y.

[73] Assignee: Vernitron Corporation, Lake Success, N.Y.

[21] Appl. No.: 641,828

[22] Filed: Aug. 17, 1984

[51] Int. Cl.⁴ .......................... G05B 1/06; H01C 10/38
[52] U.S. Cl. .................................... 318/666; 338/176; 338/194; 338/118
[58] Field of Search ................ 318/663, 666; 338/176, 338/185, 194, 160, 165, 118

[56] References Cited

U.S. PATENT DOCUMENTS

| | | | |
|---|---|---|---|
| 2,897,426 | 7/1959 | Hotine | 318/663 |
| 2,904,766 | 9/1959 | McMillan | 338/176 |
| 3,020,508 | 2/1962 | Zuehlke | 338/176 X |
| 3,364,452 | 1/1968 | Thompson | 338/176 X |
| 3,364,454 | 1/1968 | Froebe | 338/176 |
| 4,284,969 | 8/1981 | Carbonneau | 338/176 X |
| 4,479,107 | 10/1984 | Bleeke | 338/176 |

OTHER PUBLICATIONS

Kleingeld, P. J., "Design Ideas, ADC Encodes Stepper Motor Position"; 9/20/79; p. 131.

*Primary Examiner*—William M. Shoop, Jr.
*Assistant Examiner*—Patrick C. Keane
*Attorney, Agent, or Firm*—Edward H. Loveman

[57] ABSTRACT

A linear motion encoder which employs a potentiometer type motion detector. It includes an elongated rectangular or cylindrical housing in which are one or two rails for guiding an insulated block to move lengthwise of the housing while being moved by a shaft connected to the block via an anti-backlash spring means. The block carries wiper contacts which respectively contact a fixed resistance element and a fixed commutator strip mounted on one wall of the housing or on the rail. An analog to digital circuit may be disposed in the housing to apply a reference voltage to opposite ends of the resistance strip. The circuit takes a linearly variable analog voltage from the commutator strip when the block moves lengthwise inside the housing driven by the axially moving shaft.

14 Claims, 11 Drawing Figures

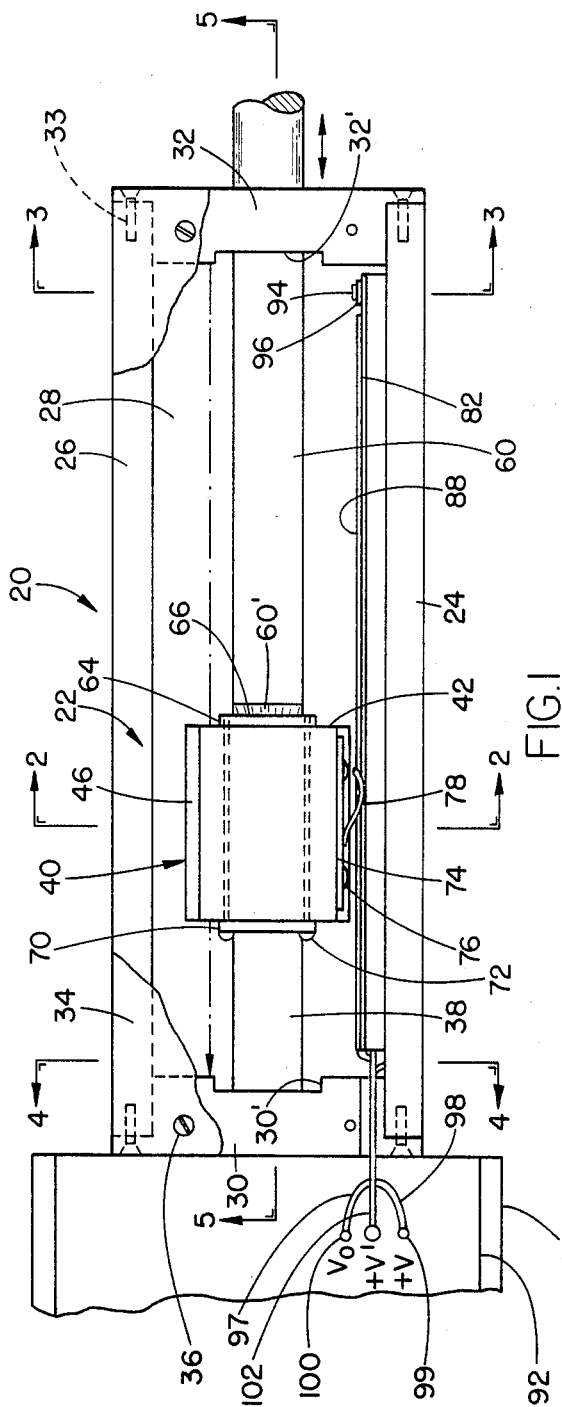

LINEAR MOTION ENCODER

This invention relates to the art of linear motion encoders of the class in which a digital pulse output is generated in response to analog signals produced by a sensor of linear motion. More particularly, the invention concerns a linear motion encoder employing a potentiometer type motion detector or sensor which produces analog voltage signals precisely proportioned to the magnitude of motion of a linearly movable member, which signals are converted to encoded digital pulses.

Prior linear motion encoders have conventionally employed motion detectors or sensors having a long glass plate etched with uniformly spaced lines or graduations. A lamp adjacent to one side of the glass plate shines light through the plate to a photoresponsive detector located on the other side of the plate. An opaque member is movable linearly along either side of the plate to interrupt the light rays impinging on the photoresponsive detector. When the opaque member moves along the plate the photoresponsive detector produces a voltage pulse as each etched line on the plate is covered by the moving member. These are analog pulses which are then encoded to digital pulses by associated analog-to-digital circuitry.

The prior linear motion encoders employing glass type motion detectors have a number of disadvantages. Most important is the fragility of the glass members. The glass plates, which must be etched precisely with spaced lines and the photoresponsive detectors associated with the glass plates, are quite expensive to manufacture, and very critical in adjustment. Where the prior encoders employ a guide mechanism of the type having a block riding in a slot along the glass plate, precise, manufacturing tolerances must be observed, which further increases the cost of manufacture of the system. A further objection is the difficulty of acurately sensing the graduations due to critical mechanical alignments, and the interference of contaminants with light source detection. These latter characteristics are very disadvantageous when maximum precision of operation is required.

The present invention is directed at apparatus which overcomes the above mentioned and other disadvantages and objections of prior linear motion encoders. According to the invention there is provided, a system or device, which is capable of continuous and infinite detection of motion of a movable member. The device employs an infinite resolution type of potentiometer which deliver a d.c. voltage output directly and exactly proportional to the length of a linear stroke of a moving block or carriage. Use of the prior graduated glass plates, light source, and photoresponsive detector is avoided.

In the present invention, an axially movable shaft drives an insulated block along a rail. The block carries a plate on which are springy wiper fingers that ride along a stationary electrically resistive film to which a d.c. voltage is applied. The electrical resistance of the film is continuous lengthwise of the film. Adjacent to and coplanar with the resistance film but spaced from it is a stationary conductive commutator strip along which rides further wiper fingers. The members described are contained in a compact housing carrying and/or connected to associated logic circuitry which converts continuously varying d.c. electrical voltage produced by the motion detector to encoded digital binary data useful for various purposes. The device may be manufactured for light duty use such as for instrumentation applications, or it may be made for heavy duty use such as required for industrial machinery.

These and other objects and many of the attendant advantages of this invention will be readily appreciated as the same becomes better understood by reference to the following detailed description when considered in connection with the accompanying drawings in which:

FIG. 1 is a top plan view of a first form of a linear motion encoder device embodying the invention, with a portion of a top cover of its housing removed to show internal parts;

FIG. 2, FIG. 3, and FIG. 4 are cross-sectional views taken along lines, 2—2, 3—3, and 4—4, respectively of FIG. 1;

Figure 5:
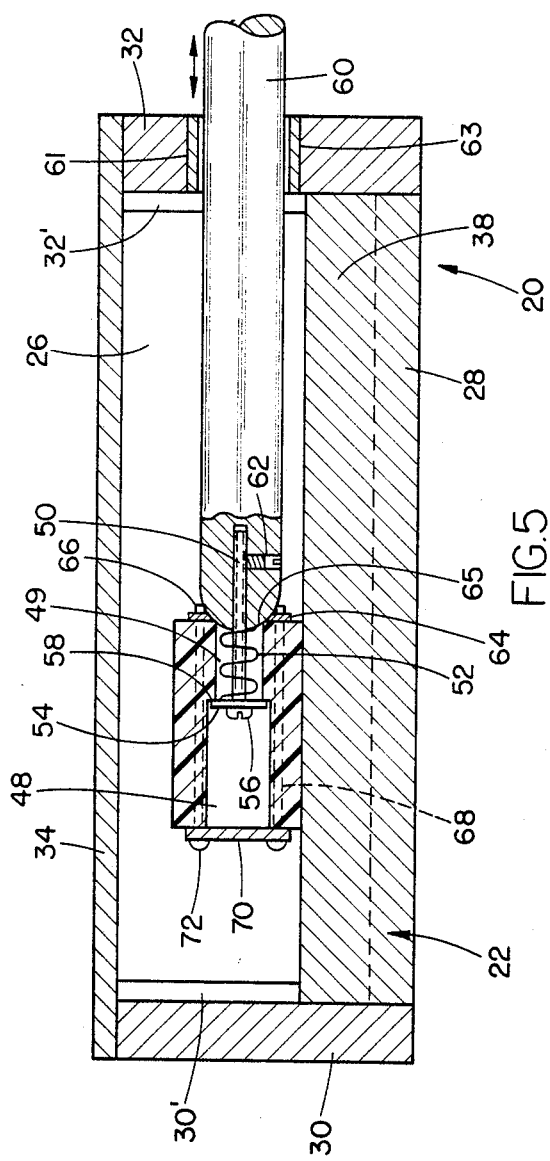
FIG. 5 is a vertical, central, longitudinal sectional view taken along line 5—5 of FIG. 1.
Figure 6:
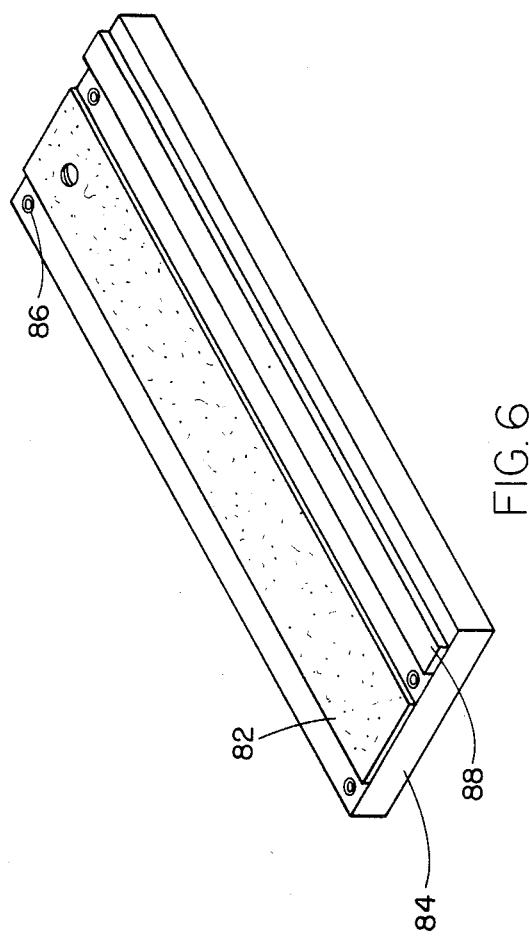
FIG. 6 is an enlarged perspective view of a resistance and commutator plate employed in the device of FIGS. 1-5.

Referring now to the drawings wherein like reference characters designate like or corresponding parts throughout, there is illustrated in FIGS. 1-5, a linear motion encoder device generally designated by reference numeral 20 having a housing 22. The housing has a pair of opposed end walls 30, 32. These walls 24, 26, 28, 30, and 32 are all made of metal and are joined together to define a long box with a top closed by a rectangular cover 34 held in place by a plurality of screws 36. The bottom 28 of the housing 22 is formed with an integral rail 38 extending the full length of the interior of the housing 22. The rail 38 is dovetailed in cross-section as clearly shown in FIGS. 2, 3, and 4.

A carriage generally designated as reference numeral 40 slides along the rail 38 and includes a generally rectangular rigid block 42 made of insulative material such as plastic. The block 42 has a dovetail groove 44 through which the rail 38 extends. The carriage 40 is mounted on the rail 38 prior to attaching the end wall 32 to the housing 22 by a plurality of screws 33. The bottom of the block 42 is formed with a pair of opposed stabilizing lateral ridges 46 which slide along the bottom of the housing 22; see FIGS. 1 and 2. A longitudinal bore 48 is formed in the block 42 and has an end portion 49 of reduced diameter in which is a screw 50 surrounded by a compressed coil spring 52. The inner or left end of the spring as viewed in FIG. 5 bears against one side of a washer 54 in the bore 48. A head 56 of the screw 50 bears on the other side of the washer 54. The rim of the washer 54 bears against an annular shoulder 58 at the inner or right end of bore portion 48. The outer end of the screw 50 is threaded in the inner or left end of an axially slidable shaft 60. The screw 50 is held in place in the shaft 60 by a set screw 62 threaded radially in the shaft 60. The shaft 60 moves axially in a cylindrical bushing 61 set in a hole 63 in the end wall 32 of the housing 22. The inner or left end 60' of the shaft 60 is rounded and nests in a spherically curved surface 65 formed around the rim of a hole in an end bearing plate 64. The plate 64 is held in place by a plurality of screws 66 engaged in the plate 64. The screws 66 extend through respective bores 68 in the block 42 and through holes in a plate 70 at the other end of the block 42. The heads 72 of the screws 66 bear against the outer side of the plate 70. By the arrangement described any slack or looseness between the shaft 60 and the block 42 is taken up by the compressed spring 52. The shaft 60 may move the block 42 axially back and forth. The shaft may also rotate without coming loose from the screw 50. The shaft 60 is loosely mounted in the bushing 61 so that it may have lateral play without losing its firm engagement with and connection to the block 42. Respective slots or grooves 30', 32' are provided at inner sides of respective end walls 30, 32 of the housing 22 to receive plates 70 and 64 at opposite ends of the carriage block 42.

Figure 7:
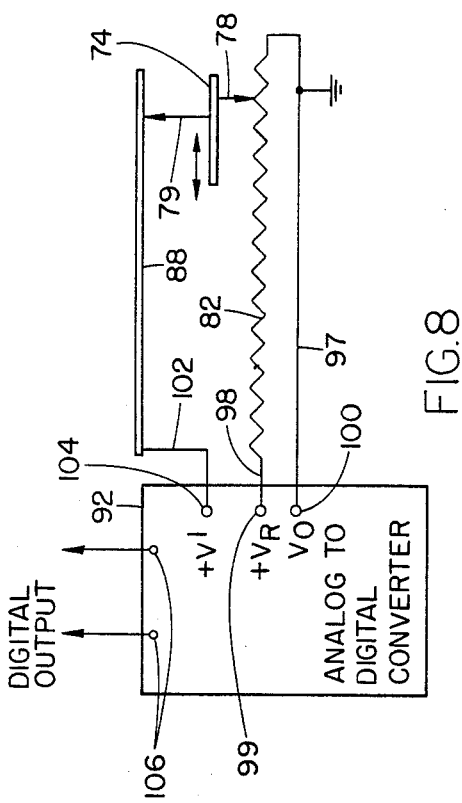
FIG. 7 is an enlarged perspective view of a spring wiper plate employed in the device of FIGS. 1-5.

On the right side of the block 42 as viewed in FIGS. 1 and 2 is a rectangular plate 74 held in place by a pair of screws 76; see FIG. 7. Mounted on the plate 74 via three screws 80 is a wiper spring plate 75 carrying two groups of wiper spring fingers 78, 79. The spring fingers 78 ride along an elongated electric resistance ribbon or film 82 attached to an insulated plate 84 which is mounted by a plurality of screws 86 on the inner side of the housing wall 24'; see FIGS. 1, 2, 3, 6. The spring fingers 79 ridge along an elongated metal commutator strip or plate 88 mounted on the plate 84, insulated and spaced from and parallel to the resistance film 82. The spring fingers 78, 79, keep contact with film 82 and strip 88 respectively as the carriage 40 moved by the shaft 60 moves back and forth on the rail 38 in the housing 22. Adjacent to the housing 22 is a circuit board 90 carrying an analog to digital converter circuit 92 shown in FIG. 8.

Figure 8:
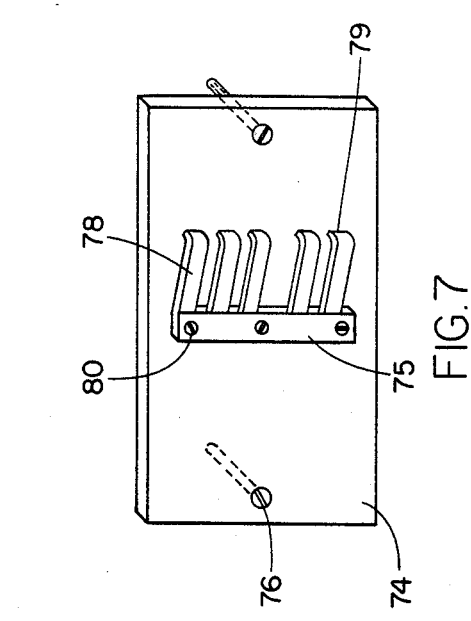
FIG. 8 is a circuit diagram or the encoder device of FIGS. 1-7 and of FIGS. 9, 10.

One end of the resistance film 82 is grounded by a screw 94 and nut 96 to housing 22; see FIG. 3. The other end of the film 82 is connected via a lead wire 98 to a terminal 99 of a reference d.c. voltage $+V_R$ (FIG. 8). A ground wire lead 97 is connected to a circuit terminal 100 which is at zero voltage $V_o$. The commutator strip 88 is connected via a lead wire 102 to a terminal 104 which applies a varying voltage $+V'$ to the circuit 92. This varying voltage $+V'$ is applied via the spring fingers 78, the wiper plate 74, and the spring fingers 79, to the strip 88 and the wire 102 to the terminal 104, while shaft 60 moves the carriage 40 along the rail 38. An analog d.c. voltage is thus applied to the circuit 92. This voltage is converted to an encoded digital binary data output at terminals 106 of the convertor circuit 92. The applied voltage $+V'$ varies continuously as the carriage 40 and the shaft 60 move linearly in the housing 22. Thus the device provides infinite resolution of linear motion without discontinuities for every axial movement of the shaft 60.

Figure 9:
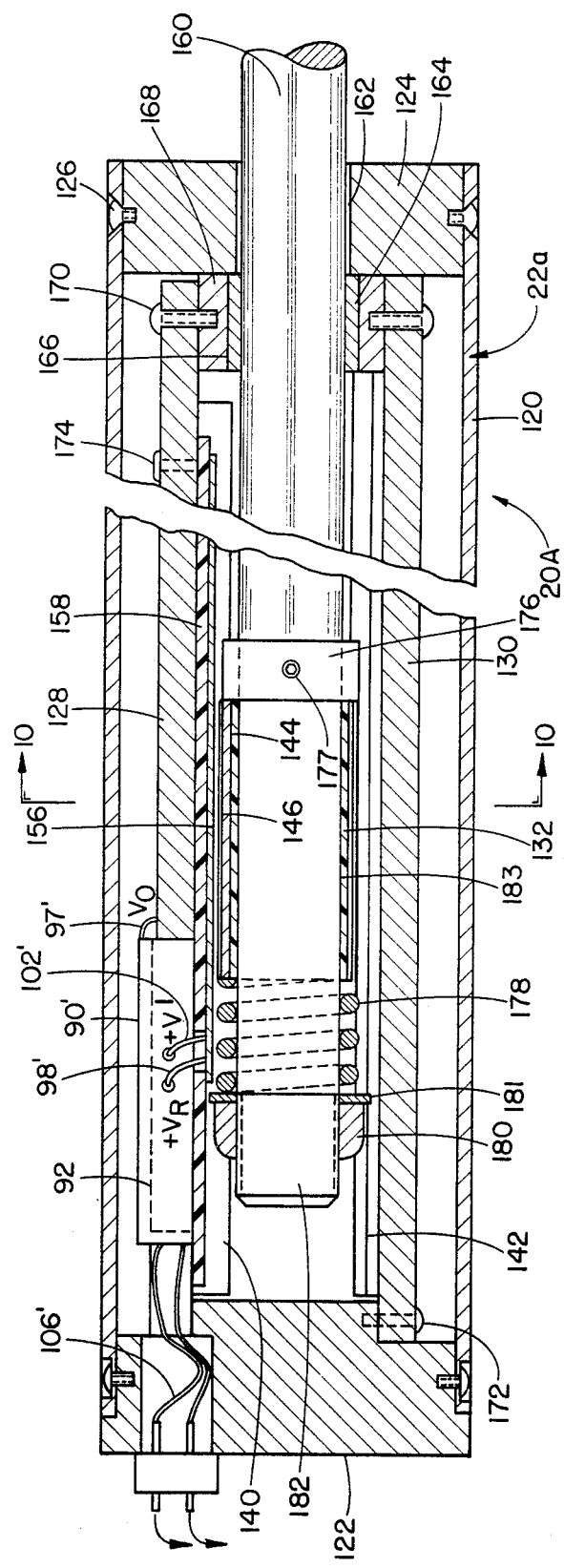
FIG. 9 is a central, horizontal sectional view of another encoder device embodying the invention.
Figures 10, 11:
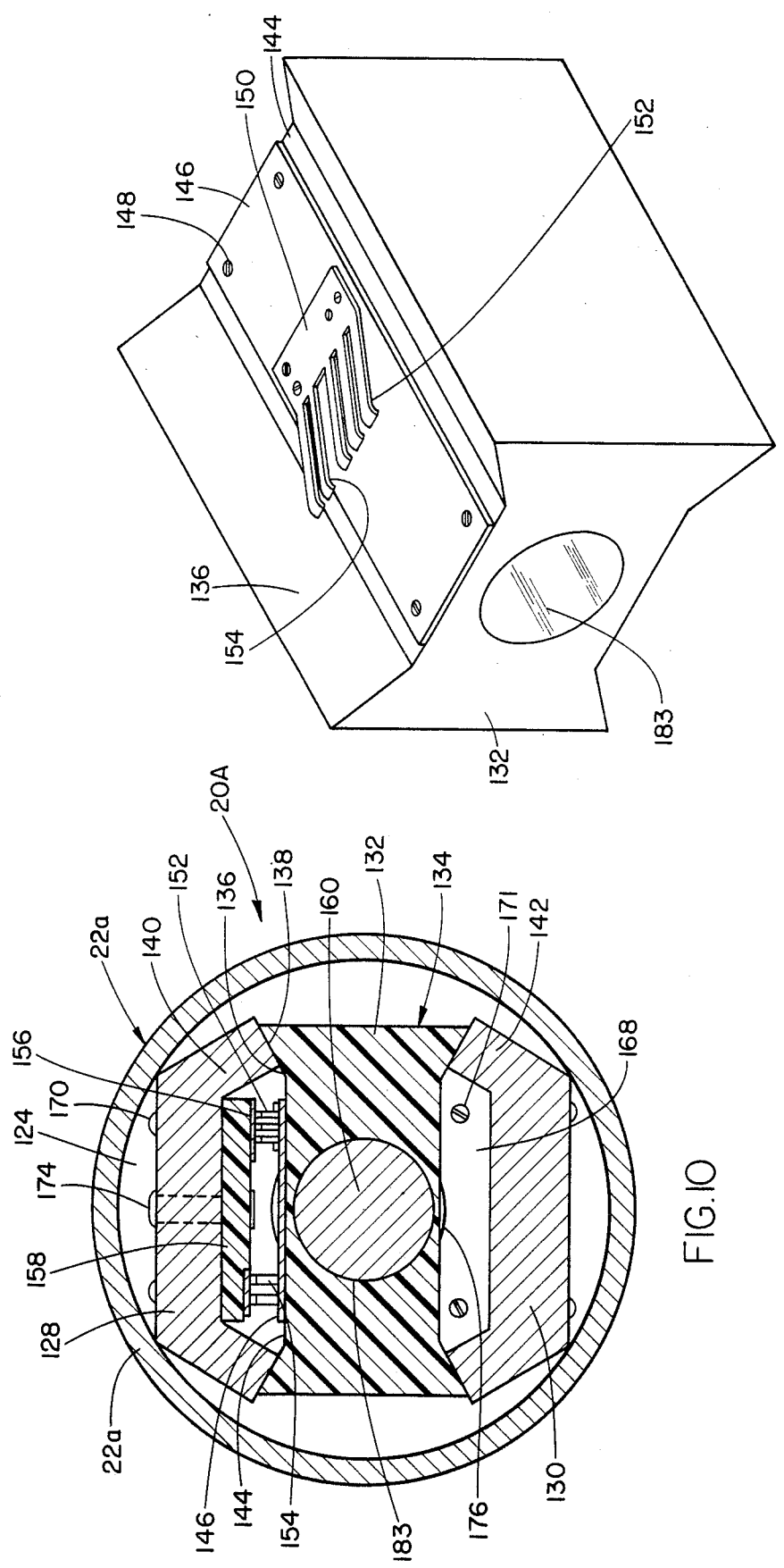
FIG. 10 is an enlarged cross-sectional view taken along line 10—10 of FIG. 9.
FIG. 11 is a further enlarged perspective view of a wiper carriage block employed in the device of FIGS. 9 and 10.

FIGS. 9 and 10 show another encoder device generally designated by reference numeral 20A adapted for use with heavy duty machinery. A housing 22a has a cylindrical body 120 closed by a pair of circular end walls 122, 124, each secured by a plurality of screws 126 to the body 120. Inside the housing 22a are horizontally opposed channel shaped rails 128, 130. An insulated block 132 of a carriage generally designated as reference numeral 134, best shown in FIGS. 10 and 11, slides axially of the housing 22a between the rails 128, 130. The block 132 has flaring outwardly turned edges 136 which slide along facing edges 138 of a pair of rail flanges 140, 142 on respective rails 128, 130. On the flat center portion 144 of the block 132 is a flat plate 146 secured by four screws 148 and carrying a conductive wiper plate 150 having upwardly projecting groups of spring fingers 152, 154 (FIG. 11).

An axially movable shaft 160 extends through a bore 162 in the end wall 124 and through a bearing bushing 164 secured in a hole 166 in an end mounting plate 168 to which one end of the rails 128, 130 are secured by screws 170. Screws 171 secure the plate 168 to the end wall 124. The left ends of the rails 128, 130 as viewed in FIG. 9 are secured by screws 172 to the end wall 122. A screw 174 grounds the right end of the resistance film 156 to the channel rail 128.

At one end of the block 132 is a collar 176 secured by a set screw 177 to shaft 160. At the other end of the block 132 is a compressed coil spring 178 held by a nut 180 and a flange 181 on the threaded end 182 of the shaft 160. By this arrangement the block 132 is moved axially by axially moving the shaft 160 in the housing 22a. The shaft 160 may rotate but it will be held in tight engagement with the block 132 by the spring 178. Lateral play of the shaft 160 is possible if it is loosely fitted in a bore 183 in the block 132 and in the bushing 164.

A circuit board 90' mounted in the housing 22a contains the analog to digital converter circuit 92 similar to that indicated in FIG. 8. An encoded digital binary data output is obtained at output leads 106'. A ground lead 97' applies ground voltage $V_o$ to the circuit 92. The ground lead 97' is connected to rail 128 which is electrically connected to the right end of resistance the film 156 by the ground screw 174. A lead wire 98' applies reference d.c. voltage $+V_R$ from the circuit 92 to the left end of the resistance film 156. A lead wire 102' applies linearly varying voltage $+V'$ to the circuit 92.

The linear motion detector and encoder device 20A operates like device 20 to generate continuous linearly varying voltages as the shaft 160 moves axially in the housing 22a driving the carriage 134 back and forth.

Both devices provide infinite, continuous linearly varying voltages without discontinuities as the shafts 60 and 160 move axially of their housings. In both devices the shafts are rotatable and may have lateral play, but they are axially held against play and backlash by the springs 52 and 178 respectively. Both devices produce encoded digital binary data upon conversion from the varying analog voltages applied from the potentiometer-like motion detectors.

The devices 20 and 20A are simpler and less expensive to manufacture than prior linear motion detectors. They avoid the use of expensive etched glass plates, photoresponsive devices and circuits, exciting lamps, etc . . . required by prior linear motion encoders. Less precise manufacturing tolerances are required in the several parts than in the prior encoders. Continuous rather than discontinuous voltages are generated while the shaft move linearly in the housings. The present devices may be connected to instruments, metering devices, industrial machinery, and in other applications where linear motion must be detected accurately and continuously.

It should be understood that the foregoing relates to only a limited number of preferred embodiments of the invention which have been by way of example only and that it is intended to cover all changes and modifications of the example of the invention herein chosen for the purpose of the disclosure, which do not constitute departures from the spirit and scope of the invention.

What is claim is:

1. A linear motion encoder, comprising:
   an elongated housing having a pair of spaced end walls;
   an insulated block movable in a straight path inside and lengthwise of said housing and having at one end thereof a spherically curved bearing plate;
   guide means in said housing supporting and constraining said block to move in said straight path;
   first and second electrically conductive wiper contact members carried by said block, said members being spaced apart and arranged in direct electric circuit with each other;
   an elongated electrical resistance element mounted in fixed position inside of and lengthwise of said housing, and disposed parallel to said path for wiping contact by said first wiper member while said block moves inside said housing;
   an electrically conductive commutator strip mounted in fixed position lengthwise of said housing, and disposed parallel to and spaced from said resistance element for wiping contact by said second wiper member;
   a shaft extending through one of said end walls and movable axially in said housing one end of said shaft being rounded to nest in said spherically curved bearing plate and connected to the end of said block proximal to said one end wall to move said block lengthwise of said housing;
   first circuit means electrically connected to said resistance element to apply a reference voltage to opposite ends of said element; and
   second circuit means connected to said strip to derive therefrom a continuous, linearly varying analog voltage while said block moves inside said housing.

2. A linear motion encoder as defined in claim 1, wherein said guide means comprises at least one stationary rail extending lengthwise inside said housing and slidably contacted by said block.

3. A linear motion encoder as defined in claim 1, wherein said housing is generally rectangular in form with a plurality of spaced opposing walls, said guide means comprising a rail integral with one of said walls, and a groove in said block engaged with said rail to constrain said block to motion longitudinally of said housing while said block slides on said rail in said housing.

4. A linear motion enclcoder as defined in claim 1, wherein said guide means comprises interfitting rail and groove means to constrain said block to motion longitudinally of said housing while said block is prevented from lateral motion by said guide means.

5. A linear motion encoder as defined in claim 3, wherein said resistance element and said commutator strip are carried by another one of said walls in substantially coplanar disposition for simultaneous wiping by said first and second wiper members respectively.

6. A linear motion encoder as defined in claim 1, wherein said guide means comprises two fixed guide rails in said housing with said block slidably disposed therebetween and constrained by said rails against lateral motion in said housing while moving lengthwise of said housing.

7. A linear motion encoder as defined in claim 6, wherein said resistance element and said strip are both carried by one of said rails facing said wiper contact members.

8. A linear motion encoder as defined in claim 6, wherein said housing is cylindrical in form, and wherein said rails have lateral flanges slidably engaging opposite sides of said block.

9. A linear motion encoder as defined in claim 1, further comprising anti-backlash means operatively connecting said shaft and said block to prevent slackness of connection between said shaft and block longitudinally of said housing.

10. A linear motion encoder as defined in claim 9, wherein said anti-backlash means comprises a coil spring disposed in a bore in said block and bearing against one end of said shaft in said housing.

11. A linear motion encoder as defined in claim 9, wherein said anti-backlash means comprises a coil spring surrounding an end of said shaft in said housing and bearing on an adjacent end of said block.

12. A linear motion encoder as defined in claim 9, further comprising bearing means in said housing arranged to permit rotation and lateral movement of said shaft while it is moving axially in said housing.

13. A linear motion encoder as defined in claim 1, further comprising analog to digital signal conversion circuitry connected in circuit with first and second circuit means to generate encoded digital binary data corresponding to linear variations of said analog voltage while said block moves in said housing.

14. A linear motion encoder as defined in claim 13, wherein said analog to digital circuitry is wholly disposed inside said housing.

* * * * *